United States Patent [19]

Imahori et al.

[11] Patent Number: 4,841,036
[45] Date of Patent: Jun. 20, 1989

[54] PHENYL AZOTHIENYLTHIAZOANILINE DIS-AZO DYE FOR POLYESTER FIBERS

[75] Inventors: Seiichi Imahori; Kiyoshi Himeno; Junji Yoshihara, all of Kanagawa, Japan

[73] Assignee: Mitsubishi Chemical Industries, Limited, Tokyo, Japan

[21] Appl. No.: 683,323

[22] Filed: Dec. 18, 1984

Related U.S. Application Data

[63] Continuation of Ser. No. 372,264, Apr. 26, 1982, abandoned.

[30] Foreign Application Priority Data

Apr. 24, 1981 [JP] Japan .................................. 56-62070

[51] Int. Cl.$^4$ .................... C09B 31/043; C09B 29/36; C09B 33/02; C09B 35/02
[52] U.S. Cl. ................................. 534/761; 534/630; 534/640; 534/643; 534/757; 534/771; 534/775
[58] Field of Search ................ 260/152, 158; 534/775, 534/764, 761

[56] References Cited

U.S. PATENT DOCUMENTS

4,124,581 11/1978 Vor Der Bruck et al. ........ 260/158
4,207,233 6/1980 Seybold et al. ..................... 260/158
4,250,090 2/1981 Ellingsfeld et al. ................ 260/158

Primary Examiner—Floyd D. Higel
Attorney, Agent, or Firm—Sughrue, Mion, Zinn, Macpeak & Seas

[57] ABSTRACT

A dis-azo dye for polyester fibers represented by the formula

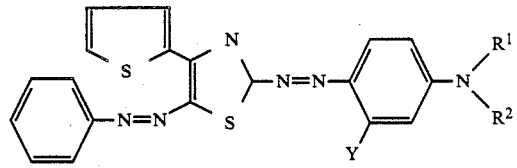

wherein Y is hydrogen or acetylamino and $R^1$ and $R^2$ are each $C_1$–$C_4$ alkyl, cyanoethyl, acetoxyethyl or $C_1$–$C_4$ alkoxyethyl.

1 Claim, No Drawings

PHENYL AZOTHIENYLTHIAZOANILINE DIS-AZO DYE FOR POLYESTER FIBERS

This is a continuation of application Ser. No. 372,264, filed 4/26/82, now abandoned.

FIELD OF THE INVENTION

The present invention relates to a dis-azo dye for polyester fibers. The dye of the present invention provides polyester fiber with a color in the range of from navy blue to green. It is also capable of dyeing polyester fibers black by itself. It has great color fastness to light, sublimation and water, as well as high stability to temperature and pH changes during dyeing.

SUMMARY OF THE INVENTION

The dis-azo dye for polyester fibers of the present invention has the formula (I):

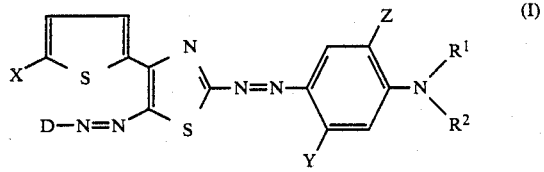

wherein D is a substituted or unsubstituted phenyl group, a substituted or unsubstituted pyridyl group, or a substituted or unsubstituted thiazolyl group; X is a hydrogen atom, chlorine atom, bromine atom or an acetyl group; Y is a hydrogen atom, chlorine atom, bromine atom, methyl group or acylamino group; Z is a hydrogen atom, chlorine atom, methyl group, methoxy group or ethoxy group; $R^1$ and $R^2$ are each a hydrogen atom, a substituted or unsubstituted alkyl group, a cyclohexyl group, alkenyl group, or aryl group.

DETAILED DESCRIPTION OF THE INVENTION

Specific examples of D in the formula (I) are as follows: a phenyl group; a phenyl group substituted by a fluorine atom, chlorine atom, bromine atom, methyl group, ethyl group, trifluoromethyl group, methoxy group, ethoxy group, phenylazo group, cyano group, nitro group, methylsulfonyl group, ethylsulfonyl group, allylsulfonyl group, lower alkoxycarbonyl group, lower alkoxyethoxycarbonyl group, allyloxyethoxycarbonyl group, mono-lower alkylaminocarbonyl group, di-lower alkylaminocarbonyl group, diallylaminocarbonyl group, mono-allylaminocarbonyl group, dimethylaminosulfonyl group, diethylaminosulfonyl group, monomethylaminosulfonyl group, monoethylaminosulfonyl group, acetyl group or phenyl group; a pyridyl group; a pyridyl group substituted by a chlorine atom, bromine atom, nitro group, methyl group, methylsulfonyl group or cyano group; a thiazolyl group; and a thiazolyl group substituted by a methyl group, chlorine atom, bromine atom, nitro group, lower alkoxycarbonyl group, methoxyethoxycarbonyl group, ethoxyethoxycarbonyl group, trifluoromethyl group or methylsulfonyl group. Examples of the acylamino group represented by Y include an acetylamino group, chloroacetylamino group, benzoylamino group, methylsulfonylamino group, chloropropionylamino group, ethoxycarbonylamino group and ethylaminocarbonylamino group. Examples of the unsubstituted alkyl group represented by $R^1$ and $R^2$ include a methyl group, ethyl group, straight or branched propyl, butyl, pentyl, hexyl, heptyl and octyl groups. Examples of the substituted alkyl group represented by $R^1$ and $R^2$ include a lower alkoxyalkyl group such as a methoxyethyl group, ethoxyethyl group or butoxyethyl group; a lower alkoxyalkoxyalkyl group such as a methoxyethoxyethyl group or ethoxyethoxyethyl group; a phenoxyalkyl group such as a phenoxyethyl group; an aralkyloxy lower alkyl group which may be substituted such as benzyloxyethyl group or chlorobenzyloxyethyl group; a hydroxyalkyl group which may be substituted such as a hydroxyethyl group, hydroxypropyl group, hydroxybutyl group, hydroxyhexyl group, or 2-hydroxy-3-methoxypropyl group; a cyano lower alkyl group such as a cyanomethyl group or cyanoethyl group; an acyloxy lower alkyl group which may be substituted such as an acetyloxyethyl group, chloroacetyloxyethyl group, chloropropionyloxyethyl group or benzoyloxyethyl group; an alkoxycarbonyloxy lower alkyl group such as a methoxycarbonyloxyethyl group or methoxyethoxycarbonyloxyethyl group; a carbamoyl lower alkyl group such as a carbamoylmethyl group or carbamoylethyl group; an alkoxycarbonyl lower alkyl group which may be substituted such as a methoxycarbonylmethyl group, ethoxycarbonylmethyl group, methoxyethoxycarbonylmethyl group or benzyloxycarbonylmethyl group; an aralkyl group which may be substituted such as a benzyl group, phenethyl group or chlorobenzyl group; an allyloxycarbonyl lower alkyl group such as an allyloxycarbonylethyl group or allyloxycarbonylmethyl group; a tetrahydrofurfuryl group; a succinimide lower alkyl group such as a succinimide ethyl group; a phthalylimide lower alkyl group such as a phthalimide ethyl group; a cyanoalkoxy lower alkyl group such as a cyanoethoxyethyl group or cyanomethoxyethyl group; and a halogeno lower alkyl group such as a chloroethyl group. Examples of the aryl group represented by $R^1$ and $R^2$ include a phenyl group, chlorophenyl group and methylphenyl group.

The dis-azo dye of the formula (I) can be produced by diazotizing an amine of the formula (II):

wherein D is the same as defined above, coupling the diazotized amine with a 2-amino-4-thienylthiazole of the formula (III):

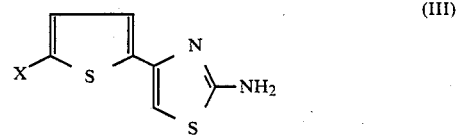

wherein X is the same as defined above, diazotizing the resulting mono-azo compound of the formula (IV):

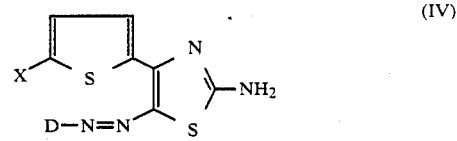

wherein D and X are each the same as defined above, and coupling the resulting diazo compound with an aniline of the formula (V):

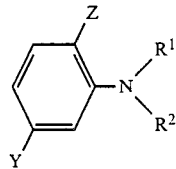

wherein Y, Z, $R^1$ and $R^2$ are each the same as defined above.

Examples of the amine represented by the formula (II) include the following: a benzene amine such as aniline, o-, m- or p-fluoroaniline, o-, m- or p-chloroaniline, o-, m- or p-bromoaniline, 2,4-dichloroaniline, 2,3-dichloroaniline, 2-chloro-4-bromoaniline, 2,4-difluoroaniline, 2,4,6-trichloroaniline, o-, m- or p-tuluidine, o-, m- or p-ethylaniline, o-, m- or p-anisidine, m-trifluoromethylaniline, 4-phenylazoaniline, o- or p-cyanoaniline, o-, m- or p-nitroaniline, 2-chloro-4-nitroaniline, 2-bromo-4-nitroaniline, 2-cyano-4-nitroaniliane, 2-chloro-4-methoxyaniline, o-, m- or p-methylsulfonylaniline, o-, m- or p-ethylsulfonylaniline, o-, m- or p-methoxycarbonylaniline, o-, m- or p-ethoxycarbonylaniline, p-butoxycarbonylaniline, p-allyloxycarbonylaniline, p-allyloxyethoxycarbonylaniline, o-, m- or p-methoxyethoxycarbonylaniline, p-N,N-dimethylaminocarbonylaniliane, p-N-ethylaminocarbonylaniline, p-N-allylaminocarbonylaniline, 2-chloro-4-methoxycarbonylaniline, p-N,N-dimethylaminosulfonylaniline, m-N,N-diethylaminosulfonylaniline, p-N-ethylaminosulfonylaniline and p-phenylaniline; a pyridine amine such as 3-aminopyridine, 3-amino-6-bromopyridine, 3-amino-5-bromopyridine, 3-amino-6-chloropyridine, 4,6-dichloro-3-aminopyridine, 3-amino-6-nitropyridine, 3-amino-4-cyanopyridine, 3-amino-5-methylpyridine, 3-amino-6-methylsulfonylpyridine, 3-amino-4-chloro-6-nitropyridine, and 3-amino-5-methyl-6-bromopyridine; a thiazole amine such as 2-aminothiazole, 2-amino-4-methylthiazole, 2-amino-4-methyl-5-ethoxycarbonylthiazole, 2-amino-5-nitrothiazole, 2-amino-5-bromothiazole, 2-amino-5-chlorothiazole, 2-amino-4-trifluoromethylthiazole, 2-amino-4-methyl-5-methoxyethoxycarbonylthiazole and 2-amino-4-methyl-5-bromothiazole.

Fibers which can be dyed with the dis-azo dye of the present invention include polyester fibers made of polyethylene terephthalate or polycondensate of terephthalic acid and 1,4-bis(hydroxymethyl)cyclohexane, or blended yarn or fabric of such polyester fibers and natural fibers such as cotton, silk and wool.

The dye of the formula (I) is a water-insoluble or sparingly soluble in water, so polyester fibers can be dyed by exhaustion dyeing or printing with a dye bath or printing paste having this dye dispersed in an aqueous medium in the presence of a dispersant such as a naphthalenesulfonic acid-formaldehyde condensate, sulfuric acid ester of higher alcohol or higher alkylbenzenesulfonate salt. For instance, conventional techniques of dip dyeing such as high-temperature dyeing, carrier dyeing and thermosol dyeing can be employed to dye polyester fibers or their blends with natural fibers, and the so dyed fibers have satisfactory fastness properties. Better results are obtained by incorporating in the dye bath an acidic substance such as formic acid, acetic acid, phosphoric acid or ammonium sulfate. The dyes of the formula (I) can be used in combination with the same or other lines of dye. The combination of the dyes of the formula (I) with themselves provides better results with respect to dyeing properties (substantivity).

The present invention is now described in greater detail by reference to the following non-limiting example.

EXAMPLE 1

A dye bath was prepared by dispersing 0.5 of a dye of the formula:

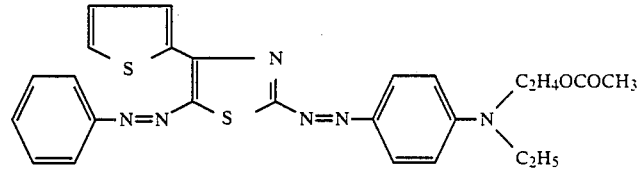

in 3 l of water containing 1 g of napthalenesulfonic acid-formaldehyde condensate and 2 g of sulfuric acid ester of higher alcohol. 100 g of polyester fibers was immersed in the bath for 60 minutes at 130° C., soaped, rinsed and dried. The dyed fibers was navy blue in color and had great fastness to light, sublimination and water. The dye had high stability to temperature and pH changes during the dyeing.

The dye used in this example was prepared as follows: 9.3 g of aniline was dissolved in 150 ml of 4% hydrochloric acid. The solution was cooled to 2° C. and mixed with 50 ml of 2 N sodium nitrite, with care taken not to cause the temperature of the mixture to exceed 5° C. The resulting solution of aniline in diazonium salt was added to a solution of 2-amino-4-thienylthiazole (18.2 g) in methanol (200 ml) to 2° C., and the mixture was stirred at 2° C. for 2 hours. The precipitating mono-azo compound was filtered off, washed with water and dried. The mono-azo compound or 2-amino-4-thienyl-5-phenylazothiazole (14.3 g) was added to a mixture of acetic acid (143 ml) and phosphoric acid (143 ml). To the resulting mixture, nitrosylsulfuric acid (prepared by dissolving 3.5 g of sodium nitrite in 20 g of 97% sulfuric acid) was added gradually at 0° to 5° C., and the mixture was stirred at 0° to 5° C. for 30 minutes to prepare a diazo solution of the mono-azo compound. A solution of N-(ethyl)-N-(β-acetoxyethyl)aniline (10.5 g) in 200 ml of methanol was added to a mixture of ice (200 g) and water (100 ml). To the resulting mixture, the previously prepared diazo solution was added, and the mixture was stirred at 0° to 5° C. for 2 hours. The precipitating dis-azo dye was filtered off, washed with water and dried. The dried dis-azo dye had a λmax (in acetone) at 609 nm.

EXAMPLE 2

As in Example 1, polyester fabrics were dyed with the compounds indicated in Table 1, and the respective fabrics were given the colors also indicated in Table 1.

TABLE 1

$$\underset{X}{\underset{\|}{\overset{S}{\bigcirc}}}\underset{}{\overset{N}{=}}\underset{S}{\overset{}{\underset{}{\bigcirc}}}-N=N-\underset{Z}{\overset{}{\bigcirc}}-\underset{Y}{\overset{}{\underset{}{\bigcirc}}}-N\underset{R^2}{\overset{R^1}{}}$$

| No. | —D | —X | —Y | —Z | —R¹ | —R² | Dyeing Shade (on polyester fibers) | λ max (acetone) nm |
|---|---|---|---|---|---|---|---|---|
| 1 | —C₆H₅ | —H | —H | —H | —C₂H₅ | —C₂H₄CN | Navy blue | 600 |
| 2 | " | " | " | " | " | —C₂H₄OCOCH₃ | " | 610 |
| 3 | " | " | " | " | " | —C₂H₄OCOOCH₃ | " | 608 |
| 4 | " | " | " | " | " | —C₂H₄COOCH₂CH=CH₂ | " | 610 |
| 5 | " | " | " | " | " | —C₂H₄OCH₃ | " | 617 |
| 6 | " | " | " | " | " | —C₂H₅ | " | 621 |
| 7 | " | " | " | " | " | —C₄H₉(n) | " | 623 |
| 8 | " | " | " | " | " | —CH₂—C₆H₅ | " | 614 |
| 9 | " | " | " | " | " | —H | " | 591 |
| 10 | " | " | " | " | " | —CH₂COOCH₃ | " | 592 |
| 11 | —C₆H₅ | —H | —H | —H | —C₂H₅ | —C₂H₄O—C₆H₅ | Navy blue | 615 |
| 12 | " | " | " | " | " | —C₂H₄OCOCH₂Cl | " | 607 |
| 13 | " | " | " | " | " | —C₂H₄COOC₄H₉(i) | " | 610 |
| 14 | " | " | " | " | " | —CH₂—(tetrahydrofuranyl) | " | 618 |
| 15 | " | " | " | " | —C₂H₄OCOCH₃ | —C₂H₄OCOCH₃ | " | 602 |
| 16 | " | " | " | " | —C₂H₄OCOOCH₃ | —C₂H₄OCOOCH₃ | " | 598 |
| 17 | " | " | " | " | —C₂H₄OCH₃ | —C₂H₄OCH₃ | " | 615 |
| 18 | " | " | " | " | —C₂H₄OCH₂—CH=CH₂ | —C₂H₄OCH₂—CH=CH₂ | " | 613 |
| 19 | " | " | " | " | —C₂H₄COOCH₃ | —C₂H₄COOCH₃ | " | 603 |

TABLE 1-continued

| No. | —D | —X | —Y | —Z | —R¹ | —R² | Dyeing Shade (on polyester fibers) | λ max (acetone) nm |
|---|---|---|---|---|---|---|---|---|
| 20 | " | " | " | " | —C₂H₄COOCH₃ | —H | " | 586 |
| 21 | " | " | " | " | —CH₂COOCH₃ | —CH₂COOCH₃ | " | 582 |
| 22 | " | " | —H | —H | —CH₃ | —CH₃ | " | 614 |
| 23 | 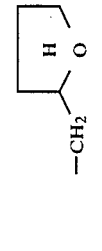 | —H | —H | " | —CH₃ | —C₂H₄COOCH₃ | Navy blue | 607 |
| 24 | " | " | " | " | —CH₂—CH=CH₂ | —CH₂—CH=CH₂ | " | 616 |
| 25 | " | " | " | " | —C₂H₅ | —C₂H₄CN | " | 597 |
| 26 | " | " | " | " | —C₂H₄OCOCH₃ | —C₂H₄COOCH₃ | " | 608 |
| 27 | " | " | " | " | —C₂H₄OCOCH₃ | —C₂H₄OCOCH₃ | " | 606 |
| 28 | " | " | " | " | —C₂H₄COOCH₃ | —C₂H₄COOCH₃ | " | 596 |
| 29 | " | " | " | " | —C₃H₇(n) | —C₂H₄CN | " | 602 |
| 30 | " | " | " | " | " | —C₃H₇(n) | " | 624 |
| 31 | " | " | " | " | " | —C₂H₄OH | " | 622 |
| 32 | " | " | " | " | tetrahydrofurfuryl | tetrahydrofurfuryl | " | 620 |
| 33 | " | " | " | " | —C₂H₄OCOC₂H₄Cl | —C₂H₄OCOC₂H₄Cl | " | 600 |
| 34 | " | —H | —CH₃ | —H | —C₂H₅ | —C₂H₄CN | " | 613 |
| 35 | 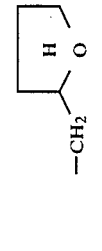 | " | —CH₃ | —H | —C₂H₅ | —C₂H₄OCOCH₃ | Navy blue | 622 |
| 36 | " | " | " | " | —C₂H₄OCOCH₃ | —C₂H₄OCOCH₃ | " | 614 |
| 37 | " | " | " | " | —C₂H₄COOCH₃ | —C₂H₄COOCH₃ | " | 615 |
| 38 | " | " | " | " | —H | methylcyclohexyl | " | 603 |

TABLE 1-continued

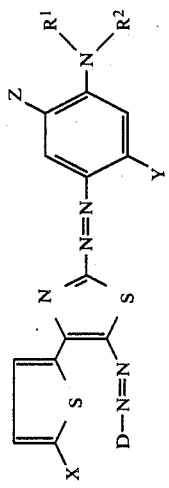

| No. | —D | —X | —Y | —Z | —R¹ | —R² | Dyeing Shade (on polyester fibers) | λ max (acetone) nm |
|---|---|---|---|---|---|---|---|---|
| 39 | " | " | —NHCOCH₃ | " | —C₂H₅ | —C₂H₄OH | Green | 634 |
| 40 | " | " | " | " | " | —C₂H₅ | " | 630 |
| 41 | " | " | " | " | —C₂H₄OCOCH₃ | —C₂H₄OCOCH₃ | Navy blue | 615 |
| 42 | " | " | " | " | —C₂H₄CN | —C₂H₅ | " | 613 |
| 43 | " | " | " | " | —C₂H₄OCH₃ | —C₂H₄OCH₃ | " | 623 |
| 44 | " | " | " | " | —C₂H₄OCOC₂H₅ | —C₂H₄OCOC₂H₅ | " | 617 |
| 45 | " | " | " | —CH₃ | —C₂H₅ | —H | " | 615 |
| 46 | " | " | " | —OCH₃ | —C₂H₄COOCH₃ | " | " | 609 |
| 47 | " | —H | —NHCOCH₃ | —OCH₃ | —C₂H₅ | —C₂H₅ | Green | 638 |
| 48 | 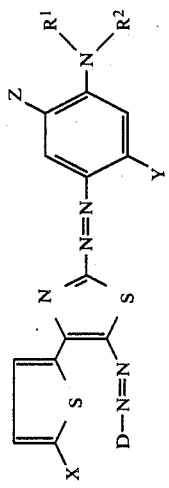 | " | —Cl | —H | —C₂H₄CN | —CH₂COOCH₂— (phenyl) | Navy blue | 588 |
| 49 | " | " | " | " | —C₂H₅ | " | " | 586 |
| 50 | " | " | " | " | —CH₂—CH=CH₂ | —CH₂COOCH₃ | " | 583 |
| 51 | " | " | " | " | —C₂H₅ | —CH₂COOCH₂—CH=CH₂ | " | 586 |
| 52 | " | " | —H | —CH₃ | —C₂H₄OCOCH₃ | —C₂H₄OCOCH₃ | " | 589 |
| 53 | —Cl | " | —Cl | —C₂H₄OCOOC₂H₅ | —C₂H₄COOC₂H₅ | " | 587 |
| 54 | " | " | " | " | —C₂H₅ | —C₂H₄COOCH₃ | " | 615 |
| 55 | " | " | " | " | " | —C₂H₄CN | " | 593 |
| 56 | " | —Br | —H | —H | " | —C₂H₄OCOCH₃ | " | 606 |
| 57 | (p-tolyl) | " | —CH₃ | " | " | —C₂H₄COOC₂H₅ | " | 618 |

TABLE 1-continued

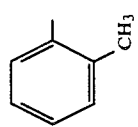

| No. | —D | —X | —Y | —Z | —R¹ | —R² | Dyeing Shade (on polyester fibers) | λ max (acetone) nm |
|---|---|---|---|---|---|---|---|---|
| 58 | o-tolyl (CH₃) | —Br | —CH₃ | —H | —C₂H₄COOCH₃ | —C₂H₄COOCH₃ | Navy blue | 611 |
| 59 | " | —COCH₃ | " | " | —C₂H₅ | —CH₂COOCH₃ | " | 615 |
| 60 | " | " | —H | " | " | —C₂H₄CN | " | 592 |
| 61 | " | —H | —NHCOCH₃ | " | —C₂H₄OCH₃ | —C₂H₄OCH₃ | " | 621 |
| 62 | p-chlorophenyl | " | —H | " | —C₂H₄CN | —C₂H₅ | " | 608 |
| 63 | " | " | " | " | " | —C₂H₄COCH₃ | " | 610 |
| 64 | " | —Cl | —Cl | " | —C₂H₄COCH₃ | —H | " | 602 |
| 65 | " | —H | —NHCOCH₃ | " | —C₂H₄COCH₃ | —C₂H₄OCOCH₃ | " | 602 |
| 66 | " | " | —H | " | —C₂H₅ | —C₂H₅ | " | 637 |
| 67 | " | —COCH₃ | " | " | —C₂H₄COOCH₃ | —H | " | 589 |
| 68 | p-bromophenyl | —H | —CH₃ | " | —C₂H₅ | —C₂H₄CN | " | 622 |
| 69 | m-chlorophenyl | —H | —H | —H | —C₂H₄OC₄H₉(n) | —C₂H₄OC₄H₉(n) | Navy blue | 620 |
| 70 | " | " | —CH₃ | " | —C₂H₄OCOCH₃ | —C₂H₄CN | " | 610 |

TABLE 1-continued

| No. | —D | —X | —Y | —Z | —R¹ | —R² | Dyeing Shade (on polyester fibers) | λ max (acetone) nm |
|---|---|---|---|---|---|---|---|---|
| 71 | 2-Cl-C₆H₄ | " | —Cl | —CH₃ | —C₂H₅ | —C₂H₄OCOCH₃ | " | 613 |
| 72 | " | " | —H | —H | —H | 4-methylcyclohexyl | " | 601 |
| 73 | " | " | —CH₃ | " | —C₂H₅ | 4-methoxyphenyl (-C₆H₄-OCH₃) | " | 624 |
| 74 | " | " | —H | " | —H | —H | " | 601 |
| 75 | 4-O₂N-C₆H₄ | " | " | " | —C₂H₅ | —C₂H₄CN | Green | 628 |
| 76 | " | " | —CH₃ | " | " | —C₂H₄OCOCH₃ | " | 639 |
| 77 | " | " | —NHCOCH₃ | " | " | —C₂H₄CN | " | 641 |
| 78 | " | " | " | " | " | —C₂H₅ | " | 655 |
| 79 | 4-(H₃COCO)-C₆H₄ | —H | —H | —H | —C₂H₅ | —C₂H₄CN | Navy blue | 619 |

TABLE 1-continued
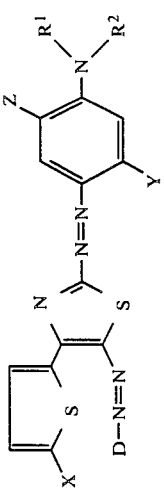
| No. | —D | —X | —Y | —Z | —R¹ | —R² | Dyeing Shade (on polyester fibers) | λ max (acetone) nm |
|---|---|---|---|---|---|---|---|---|
| 80 | 4-(CH₂=CHCH₂NHCO)C₆H₄— | " | —Cl | " | —C₂H₄OCOCH₃ | —C₂H₄OCOCH₃ | " | 612 |
| 81 | 4-(CH₂=CHCH₂OH₄C₂OCO)C₆H₄— | " | —CH₃ | " | " | —C₂H₄CN | " | 603 |
| 82 | 3-O₂N-C₆H₄— | " | —H | —CH₃ | —C₂H₅ | —C₂H₅ | Green | 645 |
| 83 | " | " | " | Cl | —C₂H₄OCOCH₃ | —H | Navy blue | 615 |
| 84 | " | " | —CH₃ | —H | —C₂H₅ | —C₂H₄CN | " | 623 |
| 85 | " | " | " | " | " | " | Green | 635 |
| 86 | 2-NC-C₆H₄— | —H | —H | " | —C₂H₅ | " | " | 625 |
| 87 | 2-NC-C₆H₄— | —H | —NHCOCH₃ | —H | —C₂H₅ | —C₂H₅ | Green | 645 |

TABLE 1-continued $$\begin{array}{c} X-\underset{S}{\overset{}{\bigcirc}}-\underset{}{\overset{N}{\underset{S}{\bigcirc}}}-N=N-\underset{Y}{\overset{Z}{\bigcirc}}-N\underset{R^2}{\overset{R^1}{}} \\ D-N=N \end{array}$$

| No. | —D | —X | —Y | —Z | —R¹ | —R² | Dyeing Shade (on polyester fibers) | λ max (acetone) nm |
|---|---|---|---|---|---|---|---|---|
| 88 | 2,4-dichlorophenyl | " | —H | " | —C₂H₄OCOCH₃ | —C₂H₄COOCH₃ | Navy blue | 615 |
| 89 | 3-chloro-4-methylsulfonylphenyl (H₃CO₂S-) | " | " | " | —CH₂—CH=CH₂ | —C₂H₄OCOCH₃ | " | 622 |
| 90 | 4-(dimethylsulfamoyl)phenyl ((CH₃)₂NO₂S-) | " | " | " | —C₂H₅ | —C₂H₄CN | " | 625 |
| 91 | 3-pyridyl | " | " | " | —C₂H₄OCOC₂H₅ | —C₂H₄OCOC₂H₅ | " | 621 |
| 92 | " | " | " | " | —C₂H₅ | —C₂H₄CN | " | 612 |
| 93 | 2,6-dichloro-3-methylpyridyl | " | " | " | —C₂H₄OC₂H₅ | —C₂H₄OC₂H₅ | " | 625 |
| 94 | " | " | " | " | —C₂H₅ | —C₂H₄OCOC₂H₄Cl | Green | 642 |

TABLE 1-continued

[Structure: D—N=N—C(S)=C(N)—... thiazole connected to phenyl with Z, Y substituents and N(R¹)(R²) amine group]

| No. | —D | —X | —Y | —Z | —R¹ | —R² | Dyeing Shade (on polyester fibers) | λ max (acetone) nm |
|---|---|---|---|---|---|---|---|---|
| 95 | [2-bromo-thiazol-5-yl with N,S] | —H | —H | —H | —C₂H₄OCOCH₃ | —C₂H₄OCOCH₃ | Green | 631 |
| 96 | [thiazol-2-yl] | " | " | " | —C₂H₄CN | —C₂H₄COOCH₃ | Navy blue | 623 |
| 97 | [5-(H₃CO₂S)-thiazol-2-yl] | " | " | " | —CH₂—CH=CH₂ | —C₂H₄CN | " | 617 |
| 98 | [5-(F₃C)-thiazol-2-yl] | " | —CH₃ | " | —C₂H₅ | —C₂H₄OCH₃ | " | 627 |
| 99 | [3-(F₃C)-phenyl] | " | —H | " | " | —C₂H₄CN | " | 624 |
| 100 | [4-(H₃CO)-phenyl] | " | " | " | —C₂H₄OCOOCH₃ | —C₂H₄OCOOCH₃ | " | 597 |

TABLE 1-continued
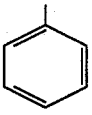
| No. | —D | —X | —Y | —Z | —R¹ | —R² | Dyeing Shade (on polyester fibers) | λ max (acetone) nm |
|---|---|---|---|---|---|---|---|---|
| 101 | 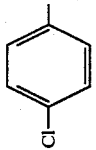 | —Cl | —NHCOCH₃ | " | —C₂H₅ | —C₂H₅ | " | 629 |
| 102 | 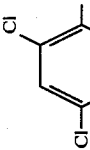 | —H | —H | —H | —C₂H₅ | —C₂H₄COOCH₃ | Navy blue | 617 |
| 103 | 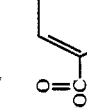 | " | " | " | " | —C₂H₄OCOOCH₃ | " | 621 |
| 104 | 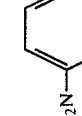 | " | " | " | —C₂H₄OCH₃ | —C₂H₄OCH₃ | Green | 638 |
| 105 | 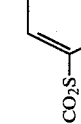 | " | " | " | —C₂H₅ | —C₂H₄OH | " | 645 |
| 106 |  | " | " | " | —C₂H₄OCOCH₃ | —C₂H₄OCOCH₃ | Navy blue | 613 |

TABLE 1-continued $$\begin{array}{c} X \underset{S}{\overset{N}{\bigcirc}} \underset{D-N=N}{\overset{N}{\bigcirc}} \underset{N=N}{\overset{Z}{\bigcirc}} \underset{Y}{\overset{R^1}{\underset{R^2}{N}}} \end{array}$$

| No. | —D | —X | —Y | —Z | —R$^1$ | —R$^2$ | Dyeing Shade (on polyester fibers) | λ max (acetone) nm |
|---|---|---|---|---|---|---|---|---|
| 107 | ![structure] 2-thiazolyl | " | —CH$_3$ | " | —C$_2$H$_5$ | —C$_2$H$_4$CN | Green | 640 |
| 108 | H$_3$C, H$_5$C$_2$OOC-substituted thiazole | " | —H | " | " | —C$_2$H$_4$OCOCH$_3$ | " | 637 |
| 109 | O$_2$N-substituted thiazole | —H | —CH$_3$ | —H | —C$_2$H$_5$ | —C$_2$H$_4$OCOCH$_3$ | Green | 654 |
| 110 | methyl-pyridyl | " | —Cl | " | —C$_2$H$_4$OCOCH$_3$ | " | Navy blue | 605 |
| 111 | methyl-bromo-pyridyl | " | —CH$_3$ | " | —C$_2$H$_5$ | —C$_2$H$_4$CN | " | 623 |

EXAMPLE 3

A dye bath was prepared by dispersing 4.0 g of a dye of the formula:

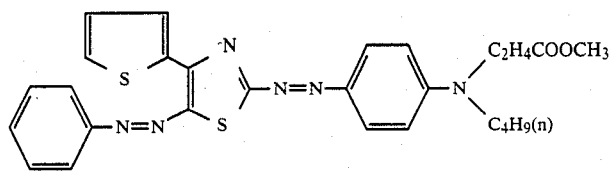

in 3 l of water containing 1 g of naphthalenesulfonic acid-formaldehyde condensate and 2 g of sulfuric acid ester of higher alcohol. 100 g of polyester fabric was immersed in the bath for 60 minutes at 130° C., soaped, rinsed and dried. The dyed fabric was black in color and had great color fastness to light, sublimination and water. The dye had high stability to temperature and pH changes during the dyeing. The dye used in this example was prepared as in Example 1, and had a λmax (in acetone) at 600 nm.

EXAMPLE 4

As in Example 3, polyester fabrics were dyed with the compounds indicated in Table 2, and all fabrics were dyed black.

TABLE 2

| No. | −D | −X | −Y | −Z | −R$^1$ | −R$^2$ | Dyeing Shade (on polyester fibers) | λ max (acetone) nm |
|---|---|---|---|---|---|---|---|---|
| 1 | phenyl | −H | −H | −H | −C$_4$H$_9$(n) | −C$_2$H$_4$CN | Black | 605 |
| 2 | " | " | " | " | −C$_3$H$_6$COOCH$_3$ | −C$_2$H$_5$ | " | 622 |
| 3 | " | " | " | " | −C$_2$H$_4$OCOCH$_3$ | −C$_2$H$_4$CN | " | 592 |
| 4 | " | " | −CH$_3$ | " | −C$_2$H$_5$ | " | " | 612 |
| 5 | H$_3$CO$_2$S−phenyl | " | −H | " | " | " | " | 627 |
| 6 | " | " | " | " | " | −C$_2$H$_4$OCOCH$_3$ | " | 635 |
| 7 | " | " | " | " | −C$_2$H$_4$OCH$_3$ | " | 637 | |
| 8 | " | " | −NHCOCH$_3$ | " | −C$_2$H$_5$ | −C$_2$H$_5$ | " | 658 |
| 9 | H$_5$C$_2$O$_2$S−phenyl | " | −H | " | −C$_2$H$_4$OCOCH$_3$ | −C$_2$H$_4$OCOCH$_3$ | " | 628 |
| 10 | NO$_2$/CN-phenyl | −H | −H | −H | −C$_2$H$_5$ | −C$_2$H$_4$CN | Black | 648 |
| 11 | " | " | " | " | " | −C$_2$H$_4$OCH$_3$ | " | 659 |
| 12 | H$_3$CO/Cl-phenyl | " | " | " | " | −C$_2$H$_4$COOCH$_3$ | " | 613 |

TABLE 2-continued

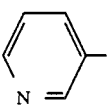

| No. | —D | —X | —Y | —Z | —R¹ | —R² | Dyeing Shade (on polyester fibers) | λ max (acetone) nm |
|---|---|---|---|---|---|---|---|---|
| 13 | 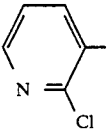 | " | " | " | —C₂H₄COOCH₃ | " | " | 615 |
| 14 | 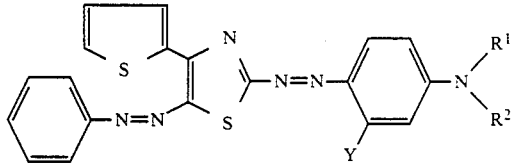 | " | " | " | —C₂H₅ | " | " | 638 |
| 15 | " | " | " | " | —C₂H₄OCH₃ | —C₂H₄OCH₃ | " | 640 |

While the invention has been described in detail and with reference to specific embodiments thereof, it will be apparent to one skilled in the art that various changes and modifications can be made therein without departing from the spirit and scope thereof.

What is claimed is:

1. A dis-azo dye for polyester fibers represented by the formula wherein Y is hydrogen or acetylamino, and $R^1$ and $R^2$ are each $C_1$–$C_4$ alkyl, cyanoethyl, acetoxyethyl or $C_1$–$C_4$ alkoxyethyl.

* * * * *